US005163470A

United States Patent [19]

Maeshiba

[11] Patent Number: 5,163,470

[45] Date of Patent: Nov. 17, 1992

[54] OVERFILL PREVENTING DEVICE IN UNDERGROUND LIQUID STORAGE TANK

[75] Inventor: Sozaburo Maeshiba, Fukuoka, Japan

[73] Assignee: Showa Kiki Kogyo Co., Ltd., Fukuoka, Japan

[21] Appl. No.: 626,800

[22] Filed: Dec. 13, 1990

[30] Foreign Application Priority Data

Dec. 29, 1989 [JP] Japan ........ 1-342149

[51] Int. Cl.[5] ........ F16K 31/18

[52] U.S. Cl. ........ 137/448; 137/434; 141/198

[58] Field of Search ........ 137/448, 445, 434, 416, 137/411, 410, 513.3, 630, 630.15, 875; 141/198, 205, 213; 251/298

[56] References Cited

U.S. PATENT DOCUMENTS

| | | | |
|---|---|---|---|
| 2,796,082 | 6/1957 | Green et al. | 137/630.15 |
| 3,078,867 | 2/1963 | McGillis et al. | 137/416 |
| 3,279,491 | 10/1966 | Brady | 137/448 |
| 3,595,272 | 7/1971 | Conklin | 137/875 |
| 4,308,894 | 1/1982 | Carpentier | 222/450 X |
| 4,667,711 | 5/1987 | Draft | 141/198 |
| 4,986,320 | 1/1991 | Kesterman et al. | 141/198 |
| 4,998,571 | 3/1991 | Blue et al. | 141/198 |

FOREIGN PATENT DOCUMENTS 1-213199 8/1989 Japan .

*Primary Examiner*—Martin P. Schwadron
*Assistant Examiner*—Kevin L. Lee
*Attorney, Agent, or Firm*—Jordan and Hamburg

[57] ABSTRACT

An overfill preventing device in an underground liquid storage tank is characterized in that a window for extending outwardly or accommodating a float is provided on a peripheral wall of a cylindrical sleeve, that an upper end of the float is pivotally attached to the cylindrical sleeve at a position above the window, and that a closure valve is mounted on the upper end of the float to open or close the cylindrical sleeve at a position above the window. Since the window for extending the float outwardly or accommodating the float inwardly is formed inside the cylindrical sleeve, the float can be firmly stored. When the float is extended outwardly from the cylindrical sleeve after installing the device of the present invention, the window is closed by a lid and the lid forms a part of the cylindrical sleeve so that construction of the space within the cylindrical sleeve necessary for liquid flow is minimized, whereby liquid is smoothly supplied into the underground liquid storage tank.

1 Claim, 5 Drawing Sheets

OVERFILL PREVENTING DEVICE IN UNDERGROUND LIQUID STORAGE TANK

The present invention relates to an overfill preventing device in an underground liquid storage tank.

BACKGROUND OF THE INVENTION

Conventionally, with respect to an underground liquid storage tank for a gas station, a valve device for preventing overfill is mounted in a liquid supply sleeve which communicates with the underground liquid storage tank. Such a device can effectively prevent the overfill of liquid into the underground liquid storage tank during the operation of filling liquid into the storage tank from a liquid carrier car.

For example, as disclosed in Japanese laid-open patent publication No. HEI 1-213199, the valve device is installed in the liquid supply sleeve. The valve device is provided with a float for closing a valve when a liquid level reaches a predetermined level and such a float has an upper end thereof pivotally attached to the liquid supply sleeve so as to pivot in an upward or downward direction.

Such a valve device is intended to be inserted into the liquid supply sleeve from an upper opening of the sleeve and to be installed in the sleeve in place. Accordingly, to enable the valve device installing operation, the tiltable float must be compactly accommodated in the valve device.

Namely, if the float is extended outwardly from the valve device, inserting of the valve device into the liquid supply sleeve becomes impossible, as it is hindered by the outwardly extended float.

Accordingly, in the above Japanese laid-open publication, a part of the peripheral surface of the cylindrical valve device is flattened or indented such that the tiltable float can be accommodated in the indented part, and when the inserting and installing of the float in the liquid supply sleeve are completed, the float is extended outwardly from the valve device to detect the rise of the liquid level.

In the above-mentioned conventional valve device, however, since the indented part for accommodating the float is formed by indenting the sleeve of the valve device per se, the liquid supply which flows down in the sleeve of the valve device cannot be smoothly fed into the underground liquid storage tank due to the narrowing or throttling of the sleeve cross-section caused by the indented part of the sleeve.

Therefore, liquid tends to be retained in the upper portion of the indented part and eventually overflows from the upper end of the valve device.

For preventing such an accident, the liquid supply amount must be regulated in relation to the throttling of the indented part of the valve device, whereby the liquid supply operation to the underground liquid storage tank requires considerable time, thus worsening the efficiency of the liquid filling operation.

Accordingly, it is an object of the present invention to provide an overfill preventing device for an underground liquid storage tank which can overcome the above-mentioned defects of the conventional valve device.

SUMMARY OF THE INVENTION

The present invention provides an overfill preventing device in an underground liquid storage tank which is characterized in that a window for extending outwardly or storing a float is provided on a peripheral wall of a cylindrical that an upper end of the float is pivotally attached to the cylindrical sleeve at a position above the window; and that a closure valve is attached to the upper end of the float to open or close the sleeve at a position above the window.

Such an overfill preventing device is inserted into a liquid supply sleeve which is communicated with the underground liquid storage tank from an upper opening of the liquid supply sleeve until the device is positioned in place in the chamber of the underground liquid storage tank.

Before inserting the device in the above manner, the float is pressed into and accommodated in the sleeve through the window, making the lid move inwardly and, while preventing the float from moving out from the outer peripheral surface of the sleeve, the device is inserted into the liquid supply sleeve and thereafter is pressed downwardly until it is firmly held in place in the underground liquid storage tank.

In the above-noted overfill preventing device installing operation, when the window passes through a liquid supply pipe and comes out from a lower end of the liquid supply sleeve, the float which is forcedly accommodated in the sleeve is extended radially outwardly to a position to detect the rise of the liquid level in the underground liquid storage tank.

Simultaneously, the window is closed by the lid and the closure valve takes a valve opened position. Therefore, when the liquid supply operation is started, liquid enters from the upper end of the liquid supply sleeve, flows down along this sleeve and is fed into the underground liquid storage tank, and when the liquid level reaches a predetermined level as the liquid level in the underground liquid storage tank rises, the float is pivotally moved upward and is rotated on the axis of the pivot shaft.

Thereafter, the closure valve moves in a closing direction corresponding to the above-described movement of the float and instantly receives the flow energy of the liquid flowing down in the sleeve to enable a firm closure of the sleeve. Therefore, the liquid level in the underground liquid storage tank is held at a predetermined level while preventing overfill of the liquid.

When the liquid level in the underground liquid storage tank is lowered corresponding to a discharging operation of the liquid from the underground liquid storage tank, the float returns to the original outwardly extended position and the closure valve is opened to prepare for the next liquid supply operation into the underground liquid storage tank.

In this operation, since the overfill preventing device has substantially no elements or parts which narrow or squeeze the cross-section of sleeve, the overflow of the liquid from the upper end of the liquid supply sleeve can be effectively prevented.

Accordingly, in the present invention, the following advantages are obtained:

a) Since the window for outwardly extending the float from the sleeve or accommodating the float inwardly into the cylindrical sleeve is formed in the cylindrical sleeve, the float can be smoothly and firmly accommodated in the cylindrical sleeve;

b) When the float is extended outwardly from the cylindrical sleeve after the installing of the device of the present invention, window is closed by the lid which forms a part of the cylindrical sleeve so that the narrowing or squeezing of space within the cylindrical sleeve neccessary for the liquid flow is minimized, whereby the liquid is smoothly supplied into the underground liquid storage tank.

DESCRIPTION OF THE PREFERRED EMBODIMENTS

The device of the present invention will now be explained in detail in conjunction with the accompanying drawings.

Figure 4:
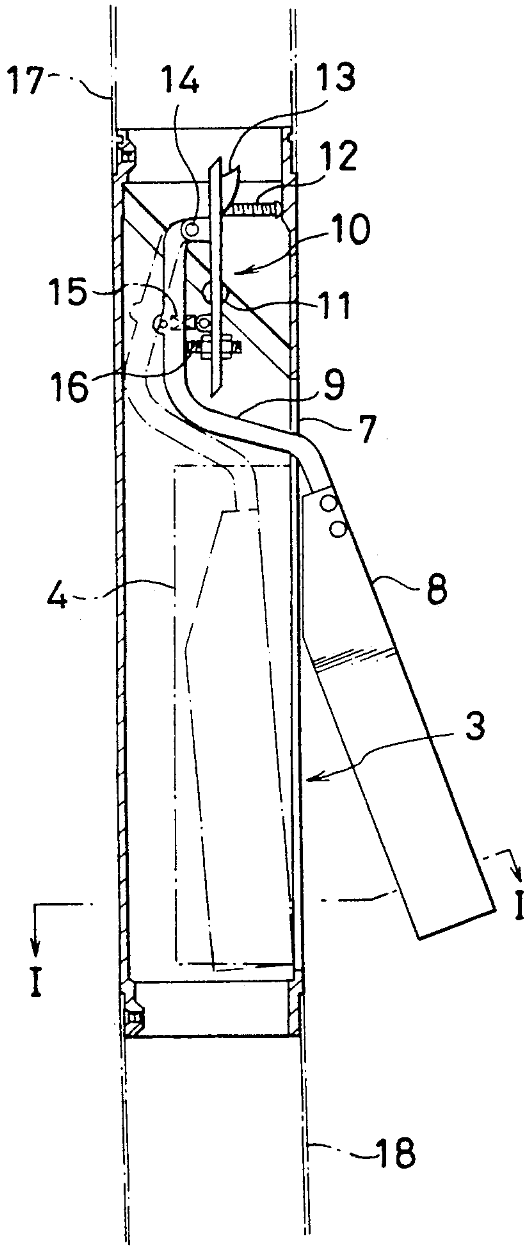
FIG. 4 is a longitudinal cross-sectional plan view of the device taken along the line II—II of FIG. 1.
Figure 6:
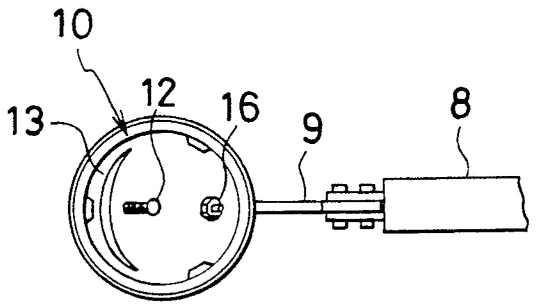
FIG. 6 is a plan view of the device in an operating condition.

As shown in FIG. 4, a window 3 which is provided for extending a float 8 outwardly or installing the float 8 inwardly is formed in the peripheral wall of a cylindrical sleeve 1. The window 3 has a narrow width and the longitudinal length thereof is approximately two-thirds of the length of the cylindrical sleeve 1 (refer to FIG. 1).

On the inner periphery of this window 3, a lid 4 is mounted so as to open or close the window 3 and numeral 5 indicates a lid pivoting portion for pivotally supporting the side periphery of the lid 4 to the side periphery of the window 3 within the cylindrical sleeve 1.

Figure 2A:
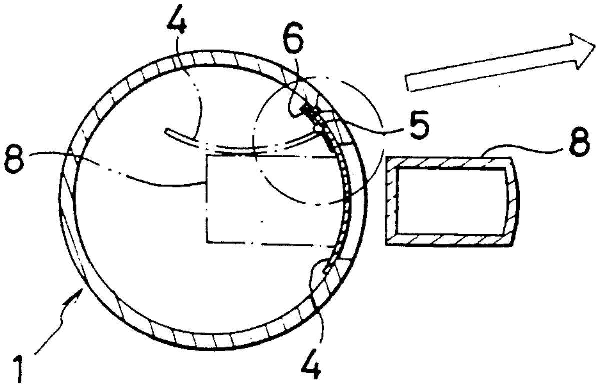
FIG. 2A is a transverse cross-sectional plan view of the device taken along the line I—I of FIG. 4.
Figure 2B:
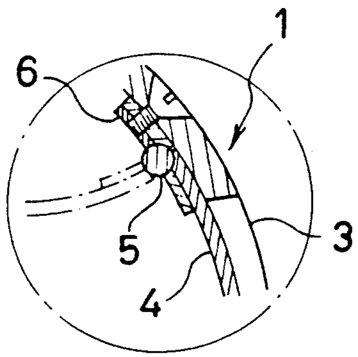
FIG. 2B is an expanded view of the circled area of FIG. 2A.

As shown in FIG. 2, the lid 4 has the same curvature as that of the peripheral wall of the cylindrical sleeve 1 so as to form a part of the peripheral wall of the cylindrical sleeve 1 when the lid 4 is closed and biased in a closing direction by a spring 6 or the like.

Figure 1:
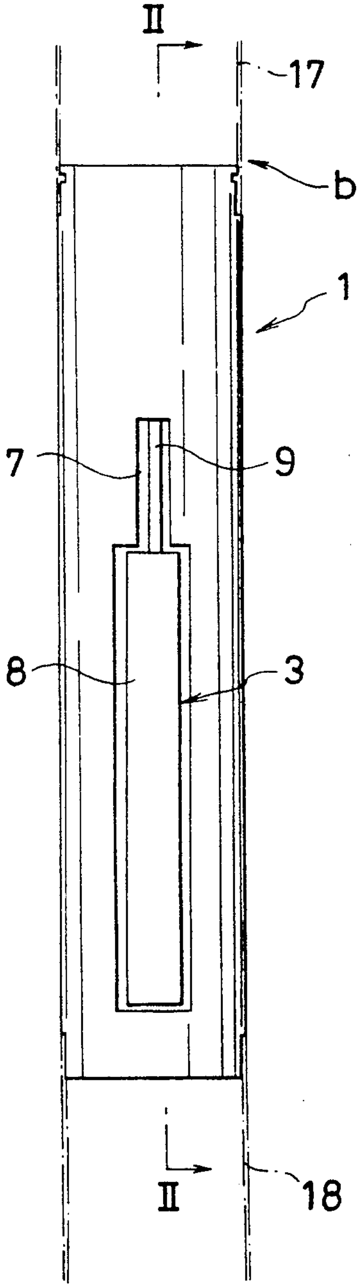
FIG. 1 is an elevational view of the overfill preventing device of the present invention.

As shown, for example, in FIG. 1, the cylindrical sleeve 1 is provided with a slit 7 at a position right above the window 3, the slit 7 being provided for allowing vertical movement of a stay 9 which supports the float 8.

In the window 3, the float 8 is disposed such that it can move inwardly or ourwardly from the window 3. Namely, the float 8 has a shape to be disposed in the window 3 and an upper end thereof connected to the stay 9. The stay 9 is, as shown in FIG. 4, provided with two bent portions in the middle thereof and a closure valve 10 at a distal end thereof.

The closure valve 10 is constructed such that when the float 8 is disposed at a normal position, namely, at a position where the float 8 is extended radially outwardly from the window 3 to detect the rise of a liquid level, the closure valve 10 is arranged to take an upright position (refer to FIG. 4). When the closure valve 10 is closed, the valve 10 is slanted at an angle of 45 degrees so as to close the inside of the cylindrical sleeve 1 (refer to FIG. 5). For that purpose, the closure valve 10 has an approximately elliptical plan shape or configuration.

The closure valve 10 is pivotally supported within the cylindrical sleeve 1 by a pivot shaft 11. Accordingly, the float 8 is rotatable on the pivot shaft 11. When the float 8 is extended outwardly from the window 3, the closure valve 10 takes the upright position to facilitate a smooth normal liquid supply operation and the lid 4 closes the window 3 from the inside of the cylindrical sleeve 1 to assure the smooth flowing down of the liquid within the cylindrical sleeve 1.

Figure 3:
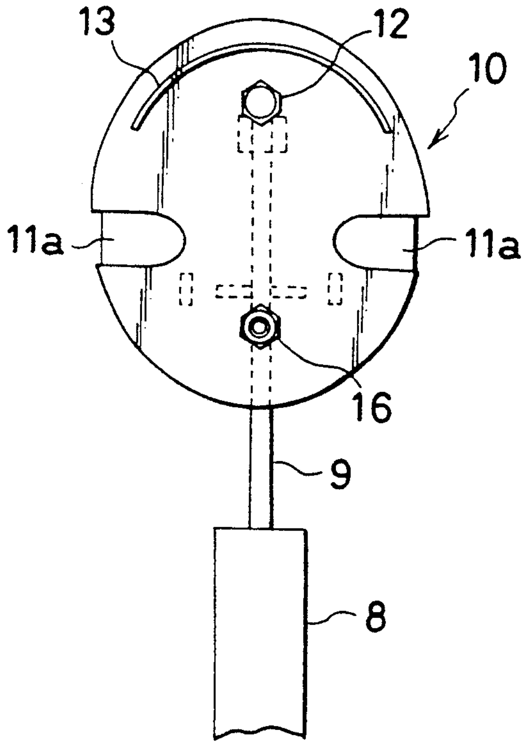
FIG. 3 is an elevational view showing the float and the closure valve of the device of the present invention.

As shown in FIG. 3, numeral 11*a* indicates a pair of pivot shaft mounting portions.

Figure 7:
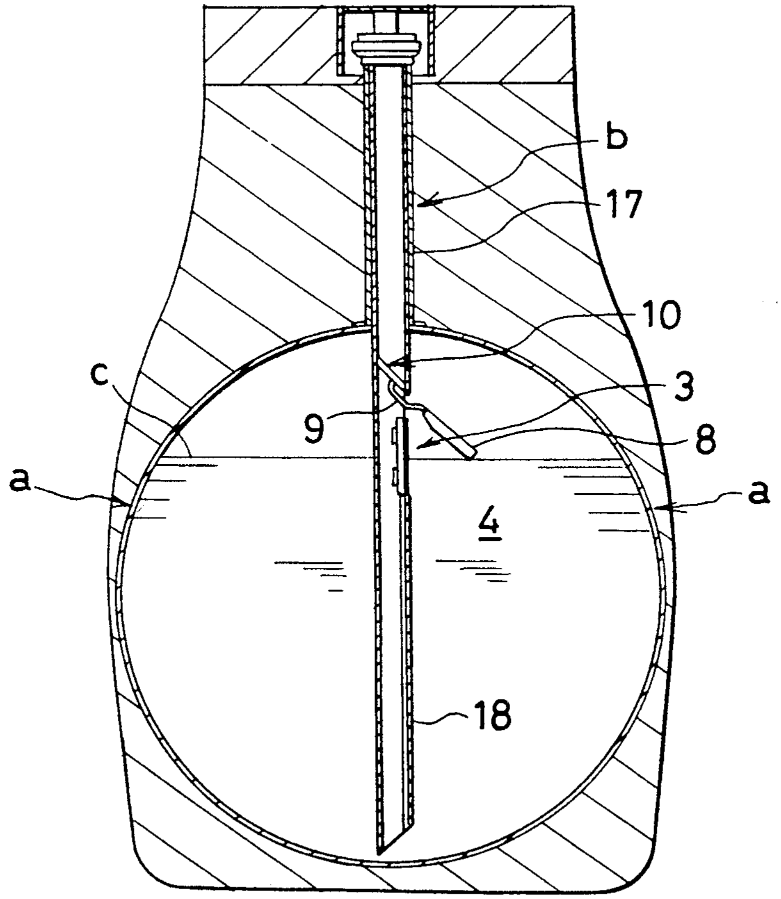
FIG. 7 is a side view of the device in an installed condition.

When liquid level c in underground liquid storage tank a is elevated and the float 8 is lifted accordingly, as shown in FIG. 7, the float 8 is rotated upwardly on the pivot shaft 11 so that the closure valve 10 is inclined to take a slanted position from the above-mentioned upright position. The liquid flowing down within the cylindrical sleeve 1 hits the closure valve 10 and the closure valve 10 is closed thus preventing the further supply of liquid into the underground liquid storage tank a (refer to FIG. 5).

Figure 5:
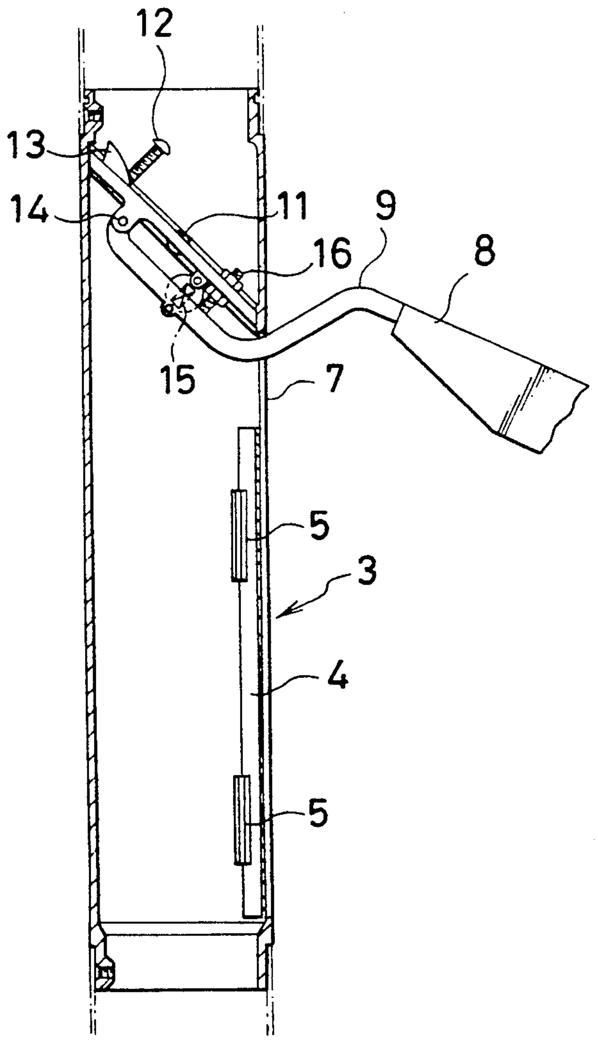
FIG. 5 is a longitudinal side view of the device in an operating condition.

As shown in FIGS. 4 and 5, numeral 12 indicates a spacer which is attached to the closure valve 10 at a position offset from the center of the closure valve 10 and is capable of coming into contact with the inner peripheral wall of the cylindrical sleeve 1, numeral 13 indicates a flow deflector, numeral 14 indicates a pivot shaft which connects the upper end of the stay 9 with a portion of the closure valve 10 which is offset from the center of the closure valve 10, numeral 15 indicates an arm spring interposed between the stay 9 and the closure valve 10, and numerals 17 and 18 indicate auxiliary pipes which are connected to upper and lower ends of the cylindrical sleeve 1, respectively.

The manner in which the overfill preventing device of the present invention is operated will now be explained.

Before conducting a liquid supply operation, as shown in FIG. 7, the device of the present invention is connected with the auxiliary pipes 17 and 18. Then, the device is inserted into the liquid supply sleeve b which is communicated with the underground liquid storage tank a until the device is installed in the underground liquid storage tank a in such a manner that the float 8 is held at a location which corresponds to the maximum liquid storage capacity of the underground liquid storage tank a.

In the above-noted operation for installing the device of the present invention, for smoothly inserting the cylindrical sleeve 1 of the device into the liquid supply sleeve b, the float 8 is accommodated in the cylindrical sleeve 1 while opening the lid 4 inwardly. When the cylindrical sleeve 1 is pressed downwardly from the lower end of the liquid supply sleeve b, the float 8 which is forcedly installed in the cylindrical sleeve 1 is extended outwardly from the cylindrical sleeve 1 through the window 3, and the lid 4 which is held at a lid opened position by the float 8 returns to a lid closed position by the biasing force of the spring 6 being set free from the restriction of the float 8.

After completion of the above-described operation, when the liquid is supplied into the underground liquid storage tank a through the liquid supply sleeve b, the liquid flows downward through the cylindrical sleeve 1 and is charged into the underground liquid storage tank a.

In the present invention, since the closure valve 10 takes an upright position in the cylindrical sleeve 1, liquid flow is not hampered by the closure valve 10. Furthermore, since the window 3 is closed by the lid 4 to form a part of the peripheral wall of the cylindrical sleeve 1, the liquid flow will also not be hampered by the lid 4.

As the liquid supply continues, the liquid level in the underground liquid storage tank a rises and when the liquid level reaches a predetermined level, the float 8 is raised upwardly so that the stay 9 and the closure valve 10 are rotated on the pivot shaft 11 to incline the closure valve 10 in a direction to close the space within the cylindrical sleeve 1. Then the liquid flowing down from the upper portion of the liquid supply sleeve b directly hits the closure valve 10 and instantly makes the closure valve 10 take the closed position. Due to the rotation of the float 8, the stay 9 cooperatively works to close the closure valve 10 by way of the adjusting spacer 16. In this valve closing operation, the arm spring 15 provides a shock absorbing function between the movement of the float 8 and the movement of the closure valve 10.

Although the overfill preventing device of the present invention is described as a device used in a gas station, needless to say the invention is applicable to numerous equipment or facilities where any liquid other than oil or gasoline is to be stored in an underground liquid storage tank.

I claim:

1. An overfill preventing device for an underground liquid storage tank comprising:

a) a cylindrical sleeve comprising a peripheral wall having a circular hollow cross-section of uniform diameter capable of being inserted into a liquid supply sleeve having a circular hollow cross-section and being installed in place in said underground liquid storage tank, b) a vertically-elongated narrow rectangular window formed in the peripheral wall of said cylindrical sleeve, c) a vertically-elongated narrow rectangular lid having a shape corresponding to the shape of said vertically elongated narrow rectangular window and having the same curvature as said cylindrical sleeve, said lid being disposed in said cylindrical sleeve for opening or closing said window, said lid having one end connected to a periphery of said window, said lid being biased in a closing direction to form a part of the peripheral wall of said cylindrical sleeve in a window fully-closed position, d) a vertically elongated narrow rectangular float pivotally attached to said cylindrical sleeve, said float being accommodated in said cylindrical sleeve through said window, being capable of pivoting completely outwardly from said window to allow said lid to be biased to said window fully-closed position, and being capable of pivoting inwardly towards said window to move said lid inwardly in said cylindrical sleeve to a window open position, and e) a closure valve rotatably disposed in said cylindrical sleeve at a position above said window, said closure valve being connected to said float for opening or closing the circular hollow cross-section of said cylindrical sleeve corresponding to said pivotal movement of said float, whereby, in said window fully-closed position, said lid does not restrict any portion of the circular hollow cross-section of said cylindrical sleeve to thereby facilitate the flow of liquid through said cylindrical sleeve.

* * * * *